United States Patent
Celi, Jr.

(10) Patent No.: US 6,615,173 B1
(45) Date of Patent: Sep. 2, 2003

(54) REAL TIME AUDIO TRANSMISSION SYSTEM SUPPORTING ASYNCHRONOUS INPUT FROM A TEXT-TO-SPEECH (TTS) ENGINE

(75) Inventor: Joseph Celi, Jr., Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 09/648,995

(22) Filed: Aug. 28, 2000

(51) Int. Cl.[7] .......................... G10L 13/08; G10L 19/14; G10L 21/04
(52) U.S. Cl. .................. 704/260; 704/201; 704/503
(58) Field of Search ................ 704/260, 246, 704/201, 503; 370/392, 389, 471, 352, 477; 709/107

(56) References Cited

U.S. PATENT DOCUMENTS

| | | | | |
|---|---|---|---|---|
| 4,782,485 A | * | 11/1988 | Gollub | 370/477 |
| 5,018,136 A | * | 5/1991 | Gollub | 370/471 |
| 5,404,522 A | * | 4/1995 | Carmon et al. | 709/107 |
| 5,526,353 A | * | 6/1996 | Henley et al. | 370/392 |
| 5,572,625 A | * | 11/1996 | Raman et al. | 704/260 |
| 5,673,362 A | * | 9/1997 | Matsumoto | 704/260 |
| 6,263,202 B1 | * | 7/2001 | Kato et al. | 704/246 |
| 6,292,484 B1 | * | 9/2001 | Oliver | 370/389 |
| 6,301,245 B1 | * | 10/2001 | Luzeski et al. | 370/352 |
| 6,377,931 B1 | * | 4/2002 | Shlomot | 704/503 |

OTHER PUBLICATIONS

Schulzrinne, Casner, Frederick and Jacobson, RFC 1889, *RTP: A Transport Protocol for Real–Time Applications* (published by Internet Engineering Task Force) (Jan. 1996).

* cited by examiner

Primary Examiner—Doris H. To
Assistant Examiner—Daniel Nolan
(74) Attorney, Agent, or Firm—Akerman Senterfitt

(57) ABSTRACT

A system for real time transmission of speech audio received from a text-to-speech (TTS) engine can include a TTS engine and a real time speech audio producer for receiving speech audio from the TTS engine over a network, and for producing formatted audio packets for transmission over the network according to the transmission interval. The transmission interval can be determined according to a packetization delay parameter.

29 Claims, 5 Drawing Sheets

REAL TIME AUDIO TRANSMISSION SYSTEM SUPPORTING ASYNCHRONOUS INPUT FROM A TEXT-TO-SPEECH (TTS) ENGINE

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech enabled computing and more particularly to a system and method for real time transmission of speech audio asynchronously received from a text-to-speech engine in a computer communications network.

2. Description of the Related Art

Text-to-speech (TTS) engines are well-known in the art. Typically, a TTS engine can be used to convert computer recognizable text to audio which can be transmitted to an external audio device for ultimate audible presentation to a listener. Specifically, TTS technology permits users to audibly play back documents and provides applications with the ability to read information to the user. Whether running on a desktop computer, a telephony network, over the Internet, or in an automobile, the increased functionality of TTS-enabled applications can provide users with information access anytime, anywhere with almost any device.

In the telephony environment, TTS technology can convert text to speech, reducing the need for prerecorded interactive voice response (IVR) messages and providing users with the ability to access textual information over a telephone. The advent of Voice over IP (VoIP) technology has facilitated the development of enabled applications over networks. This network convergence has opened the door to TTS-novel applications, for example voice browsing of Web sites over the Internet.

In order to transmit audio data over a computer communications network, a media transport protocol typically is employed. Presently, the Real Time Transport Protocol (RTP) is a preferred protocol for transporting real time media over a computer communications network. RTP provides end-to-end network transport functions suitable for applications transmitting real-time data, such as audio, video or simulation data, over multicast or unicast network services. RTP is described in detail in Schulzrinne, Casner, Frederick and Jacobson, RFC1889, RTP: A Transport Protocol for Real-Time Applications published by Internet Engineering Task Force (IETF) in January 1996 and incorporated herein by reference.

Notwithstanding, the output of a TTS engine is not ideal for real time transmission using RTP. For example, while a VoIP telephony gateway can require speech audio to arrive in the telephony gateway in a synchronized fashion in a specific format according to an underlying media protocol, the output of a TTS engine can take the form of chunks of speech audio that asynchronously can be provided at random time intervals by the TTS engine. Moreover, the chunks of speech audio can have a varying size. Finally, the format of data received from a TTS engine can vary from application to application. Accordingly, what is needed is a system and method for real time transmission of speech audio asynchronously received from a TTS engine in a computer communications network.

SUMMARY OF THE INVENTION

The present invention is system and method for real time transmission of speech audio asynchronously received from a text-to-speech (TTS) engine in a computer communications network. A system for real time transmission of speech audio asynchronously received from a TTS in a computer communications network can include a TTS engine for producing speech audio for transmission in the computer communications network; and, a real time speech audio producer for receiving the speech audio and for producing formatted audio packets for transmission over the network according to a transmission interval.

Notably, the transmission interval can fixed or variable and can be determined according to a packetization delay parameter. In addition, the real time speech audio producer can implement a thread for execution in a multi-threaded application. Finally, the system can further include a telephony gateway server communicatively linked to the real time speech audio producer. As such, the telephony gateway server can receive the produced formatted audio packets transmitted according to the transmission interval.

In a representative embodiment of the present invention, the real time speech audio producer can include a TTS audio receiver for receiving the produced speech audio from the TTS engine; an audio data compressor for compressing the received speech audio into an audio buffer; a speech audio packet formatter for formatting speech audio in the audio buffer into formatted audio packets suitable for transmission over the network; and, a transmission queue for queuing the formatted audio packets for transmission over the network. The real time speech audio producer can also include a silence detector for detecting transmission intervals in which no speech audio data from the TTS engine is available for transmission across the network; and, a silence packet generator for producing formatted silence packets in lieu of the uniformly formatted audio packets responsive to detecting the intervals in which no speech audio data from the TTS engine is available for transmission across the network.

A method for real time transmission of speech audio received from a TTS engine in a computer communications network can include receiving speech audio from the TTS engine; formatting the received speech audio into formatted audio packets suitable for transmission to an audio output device over the computer communications network; and, transmitting the formatted audio packets to the audio output device over the computer communications network according to a transmission interval. The method can further include detecting transmission intervals in which no speech audio data from the TTS engine is available for transmission across the network; and, formatting silence packets and transmitting the silence packets in lieu of the audio packets responsive to detecting the transmission intervals in which no speech audio data from the TTS engine is available for transmission across the network.

In a representative embodiment of the method of the invention, the method can also include compressing the speech audio into an audio buffer from which the audio packets can be formatted in the formatting step. In another representative embodiment, the method can further include queuing the formatted audio packets for transmission to the audio output device over the computer communications network according to the fixed transmission interval. In yet another representative embodiment, the method can further include queuing the formatted audio packets and the formatted silence packets for transmission to the audio output device over the computer communications network according to the transmission interval.

Notably, the step of transmitting the formatted audio packets to the audio output device over the computer communications network according to a transmission interval can include transmitting the formatted audio packets to a telephony gateway server over the computer communications network according to a transmission interval. Moreover, the method can also include determining the transmission interval according to a packetization delay parameter.

Advantageously, the method can be implemented in a multi-threaded application as a producer in a producer/consumer model for providing digitized speech audio over the network. In that instance, the method can include implementing the formatting and transmitting steps in a thread for execution in the multi-threaded application. Additionally, the method can include implementing the formatting audio packets step, the transmitting the audio packets step, the detecting step, and the formatting and transmitting the silence packets step in a thread for execution in a multi-threaded application. Finally, the method can include implementing the compressing step in the thread and the queuing step in the thread.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention is a system and method for real time transmission of speech audio received from a text-to-speech (TTS) engine in a computer communications network. The system for real time transmission of speech audio received from a TTS engine can facilitate the real time transmission of the received speech audio by compressing the speech data into an audio buffer and formatting the speech data in the audio buffer into an audio packet suitable for transmission over the network. Subsequently, the formatted audio packet can be queued for transmission over the network in accordance with a transmission interval which can be determined, for example, by a packetization delay parameter used in the transmission of media according to the Real Time Transport Protocol (RTP).

Significantly, the present invention can be used to transmit speech audio asynchronously produced by the TTS engine to a telephony gateway typically used as an interface between a Voice over IP (VoIP) network and a packet switched telephone network (PSTN). However, on occasion, it is possible that the TTS engine does not produce speech audio during a particular transmission interval. Consequently, in order to maintain a connection to the telephony gateway, silence packets can be transmitted to the telephony gateway in lieu of the formatted audio packets in those circumstances in which no speech audio data from the TTS engine is available for transmission across the network. Hence, by selectively choosing when to transmit formatted audio packets and formatted silence packets, the present invention can maintain the connection with the telephony gateway despite the asynchronous receipt and non-receipt of speech audio from the TTS engine.

Finally, the present invention can implement a thread in a multi-threaded application. Specifically, the formatting of the audio and silence packets, queuing of the audio and silence packets, and the transmission of the audio and silence packets can run in a thread separate from other executing processes in a multi-threaded speech driven application. Accordingly, the TTS engine can asynchronously provide speech data which can be handled in the present invention separately in the thread. Furthermore, subsequent to the completion of the formatting, queuing and transmitting steps, but prior to the beginning of the next transmission interval, the thread can yield to other executing processes having an equal or higher priority.

Figure 1A:
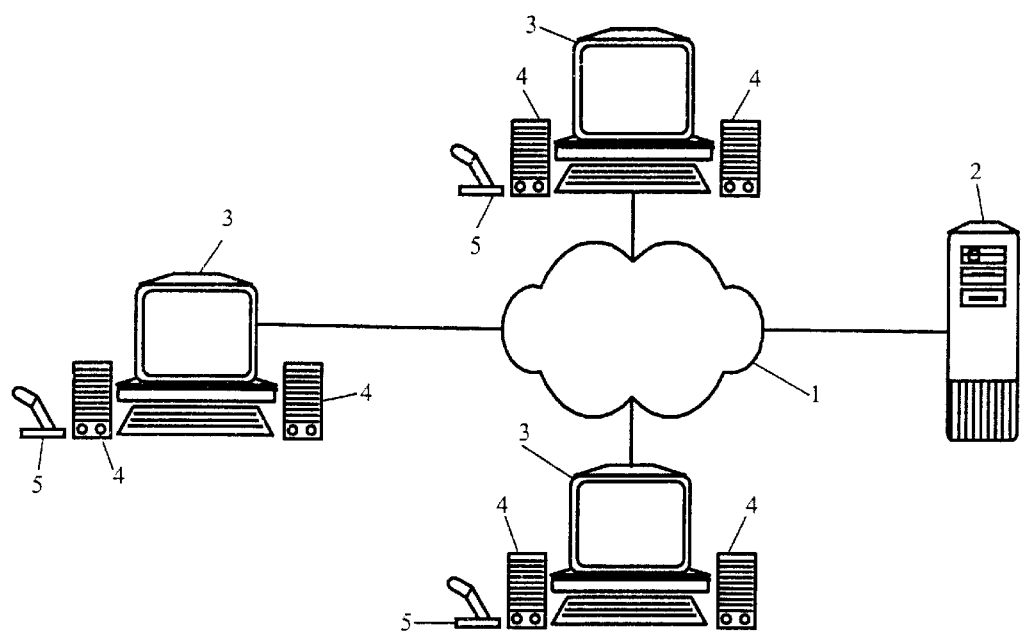
FIGS. 1A and 1B are pictorial representations of exemplary network topologies in which the system and method of the invention can be practiced.
Figure 1B:
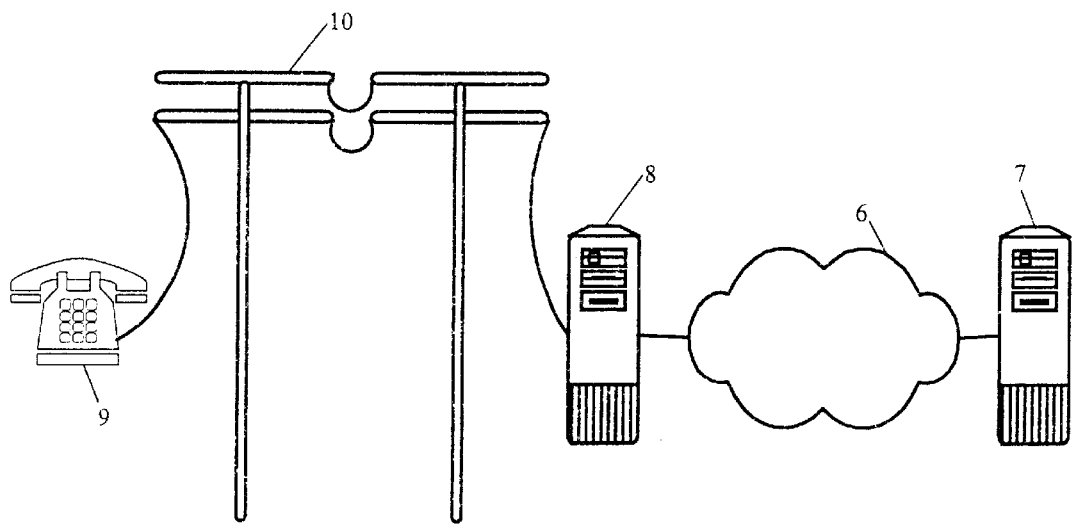

FIGS. 1A and 1B are pictorial illustrations of various network topologies in which a system and method for real time transmission of speech audio received from a TTS engine in a computer communications network can be implemented. FIG. 1A depicts the simpler case in which a plurality of computing devices 3 are communicatively connected to a speech server 2 through a network 1. Each computing device 3 can include an audio input device 5 and an audio output device 4. In the topology shown in FIG. 1A, the audio input device 5 is shown to be an external microphone. Similarly, the audio output device 4 is shown to be a pair of external audio speakers. Notwithstanding, the particular topology illustrated in FIG. 1A is not limited in regard to the computing devices 3 shown. Specifically, the computing devices 3 can be any of those computing device which are suitable for receiving and transmitting speech audio. Examples of some suitable computing devices can include speech-enabled embedded systems and speech-enabled wireless handheld devices. Also, the audio input and output devices, 4, 5 are not limited merely to a microphone and speakers. Rather, other suitable audio input and output devices can be substituted in lieu of the microphone and speakers.

The speech server 2 of FIG. 1A can include a computing device suitable for storing and executing the speech driven application, transmitting and receiving speech audio data over the network 1, processing the speech audio data, for example performing speech-to-text conversion and TTS conversion, and transporting speech audio data between the network 1 and the speech driven application. Many computing devices are well-known to have a sufficient configuration for performing the above-noted tasks, including one of the many high-speed multimedia computers manufactured by International Business Machines Corporation of Armonk, New York. Notwithstanding, other suitable computing devices can be substituted for the speech server 2 including embedded computing devices and wireless handheld devices.

The transmission of speech audio between a PSTN and a traditional computer communications network is well-known in the art. In particular, it is known to provide distributed voice applications over a computer communications network which can interface with a PSTN through a VoIP telephony gateway. As such, the present invention can be employed in a VoIP network or other similarly functional network. In particular, FIG. 1B depicts an Interactive Voice Response (IVR) system in which a user can provide speech audio through a telephone device 9 across a telephone network 10 into a computer communications network 6 by way of a telephony gateway 8. Specifically, as shown in FIG. 1B, a telephony gateway 8 can receive speech audio data from a telephone network 10 and provide the same to a speech server 7 over the network 6. Conversely, the telephony gateway 8 can receive speech audio data from the speech server 7 and can transmit the same over the telephone network 10 to the telephone device 9. Hence, the use of the telephone device 9 can provide the same utility as the audio input and output devices 4, 5 of FIG. 1A.

Figure 2:
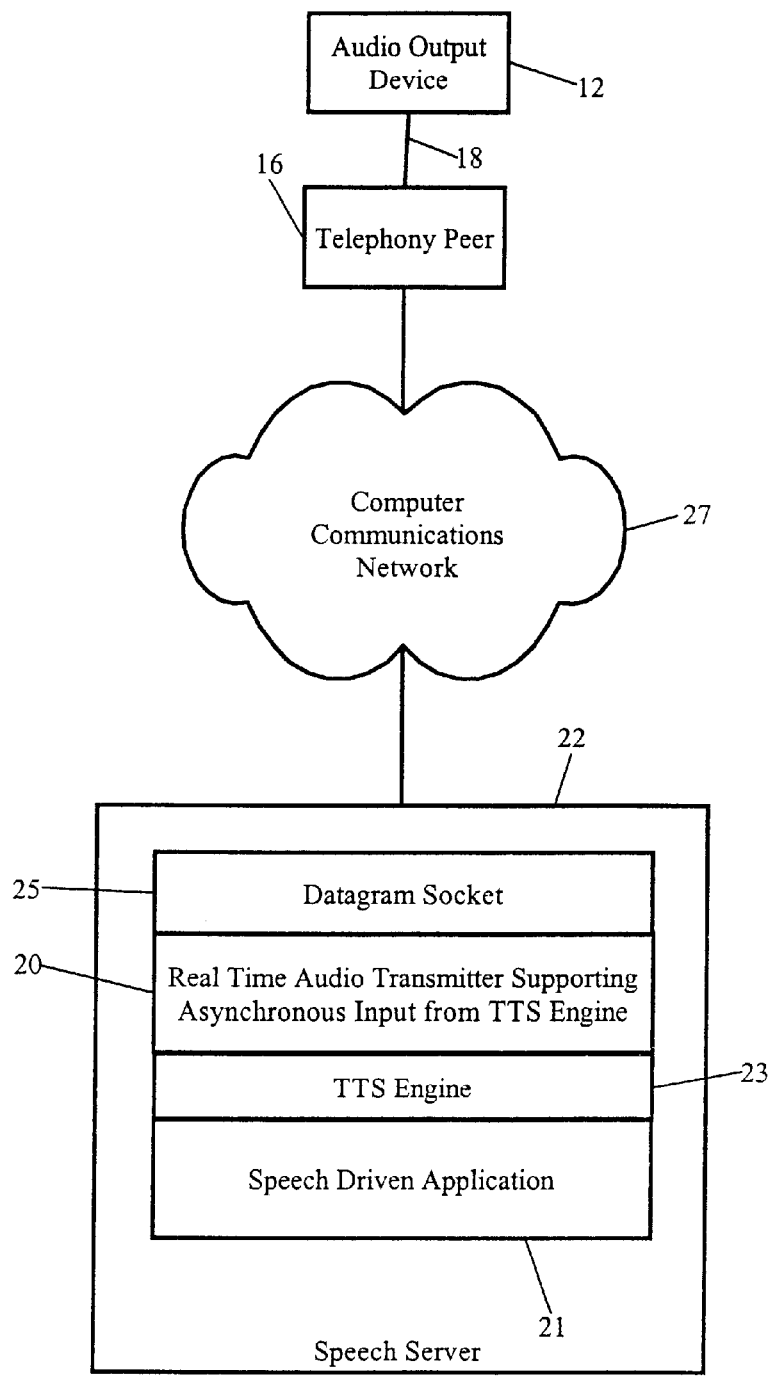
FIG. 2 is a schematic diagram of a system for real time transmission of speech audio received from a text-to-speech (TTS) engine in a computer communications network in accordance with the inventive arrangements.

FIG. 2 is a schematic diagram of a representative embodiment of the real time transmission system as implemented in a speech server 22. In the representative embodiment of the present invention, speech audio can be audibly provided through audio output device 12. More particularly, as shown in FIG. 2, audio output device 12 can be incorporated in a telephone handset through which a user can hear spoken information from speech server 22. Notwithstanding, the invention is not limited merely to a telephone handset. Rather, any suitable audio output device through which speech audio can be provided can suffice for the purposes of the present invention. For example, the use of speakers in combination with a personal computer and telephony interface is well known as a substitute for a telephone handset.

In the representative embodiment, the speech server 22 is an H.323 compliant VoIP client which can establish a communications link to the audio output device 12 through a telephony gateway using an H.323 call control interface. The established communications link can be used to transmit network originating speech audio to the audio output device 12 in the PSTN 18. In particular, using the established communications link, the telephony gateway can relay to the audio output device 12 speech synthesized text produced in the speech server 22.

More specifically, upon establishing a communications link, speech audio generated in the speech server 22 can be transmitted across the computer communications network 27 to the telephony peer 16 which can act as a telephony gateway between the PSTN 18 and the computer communications network 27. The telephony peer 16 can decode, decompress, and reconstruct the digitized speech into an analog speech signal suitable for transmission over the PSTN 18. Subsequently, the telephony peer 16 can transmit the analog speech signal over the PSTN 18 to the audio output device 12 through which the user can hear an audio response. An exemplary telephony peer 16 can include a VoIP gateway server for providing an interface between a PSTN and H.323 compliant VoIP clients.

The speech server 22 of the present invention can include therein a speech driven application 21 in which logic can be performed and responses formulated based upon input received through the computer communications network 27. More particularly, responses to user input can be formulated by the speech driven application and converted into digitized speech by the TTS engine 23. Subsequently, the digitized speech can be transmitted over the computer communications network 27, ultimately over the PSTN 18, and finally to the audio output device 12.

In order to transport digitized speech over the computer communications network, a media transport protocol must be employed so that the digitized speech can be uniformly transmitted across a conventional data communications network such as the computer communications network 27 of the present invention. In the present invention, digitized speech can be transmitted across the computer communications network using RTP. However, the digitized speech output from the TTS engine 23 is not necessarily formatted for transmission using RTP. Moreover, the digitized speech is output asynchronously in chunks of varying sized speech audio data. Accordingly, as shown in FIG. 2, a real time speech audio producer 20 is included in the present invention which can receive speech audio from the TTS engine 23 and produce formatted audio packets for transmission over the network.

More particularly, the TTS engine 23 can maintain a communicative link to the real time audio producer 20. When the TTS engine 23 produces speech audio output, the speech audio output can be provided asynchronously to the real time audio producer 20. Independent of the behavior of the TTS engine 23, the real time audio producer 20 can periodically check for speech audio provided by the TTS engine 23. In one representative embodiment, the real time audio producer 20 can check for speech audio at the beginning of a transmission interval defined according to the value of the RTP packetization delay parameter.

Upon identifying speech audio received from the TTS engine 23, the real time audio producer 20 can compress the speech audio into a buffer and format the speech audio into an RTP-compliant speech audio packet. Subsequently, the real time audio producer can queue the formatted packet for transmission to the telephony peer 16 through a datagram socket 25 according to the transmission interval. Significantly, if at the beginning of a transmission interval the real time audio producer 20 determines that speech audio has not been received from the TTS engine 23, in order to maintain the telephonic connection between the audio output device 12 and the speech server 22, silence packets are transmitted to the telephony peer 16. Specifically, RTP-compliant silence packets are constructed and queued for transmission as if the silence packets were speech audio packets.

Notably, the real time audio producer 20 can implement a thread in a multi-threaded application. That is, the formatting, queuing and transmitting functions of the real time audio producer 20 can be performed in a thread executing independently of other processes in the speech server 22. At the beginning of each transmission interval, the real time audio producer 20 can "wake", scan the buffer for audio data, format the audio data (or silence data) into RTP-compliant packets, queue the data for transmission as needed, and transmit the data across the datagram socket 25 to the telephony server 16. Subsequently, the real time audio producer 20 can "sleep" for a transmission interval prior to waking again.

Figure 3A:
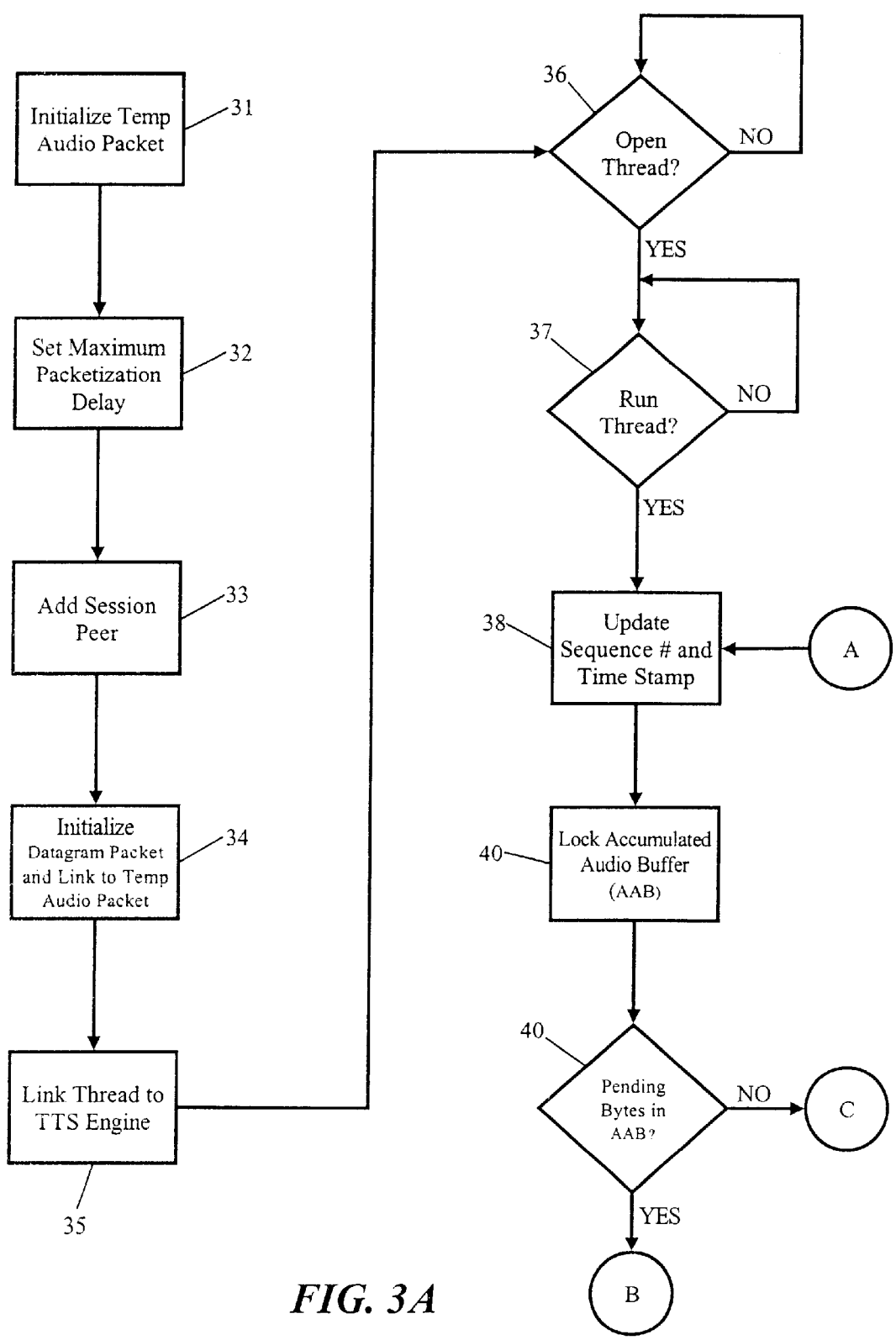
FIGS. 3A–3C, taken together, are a flow chart illustrating a method for real time transmission of speech audio received from a text-to-speech (TTS) engine in a computer communications network in accordance with the inventive arrangements.
Figure 3B:
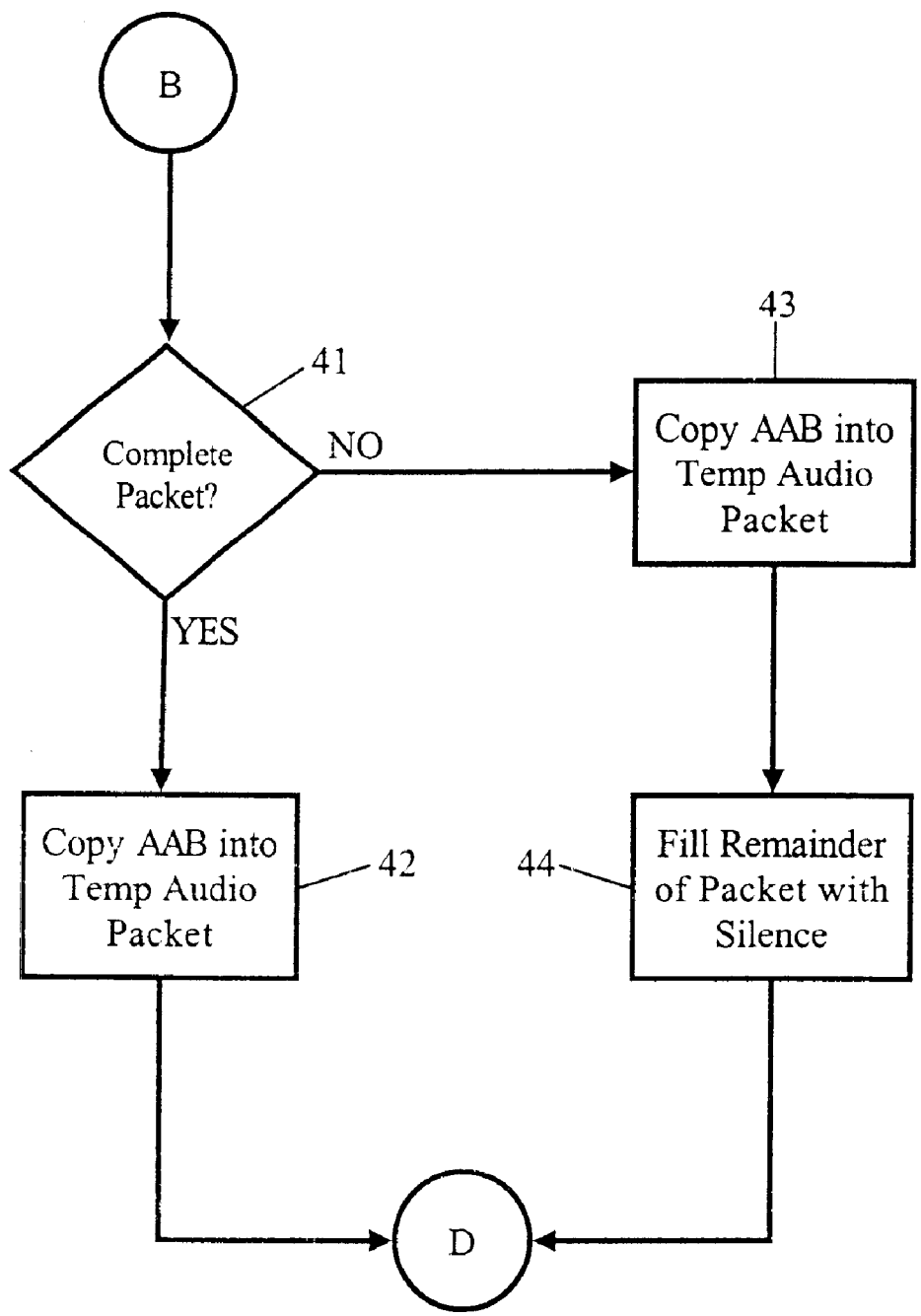
Figure 3C:
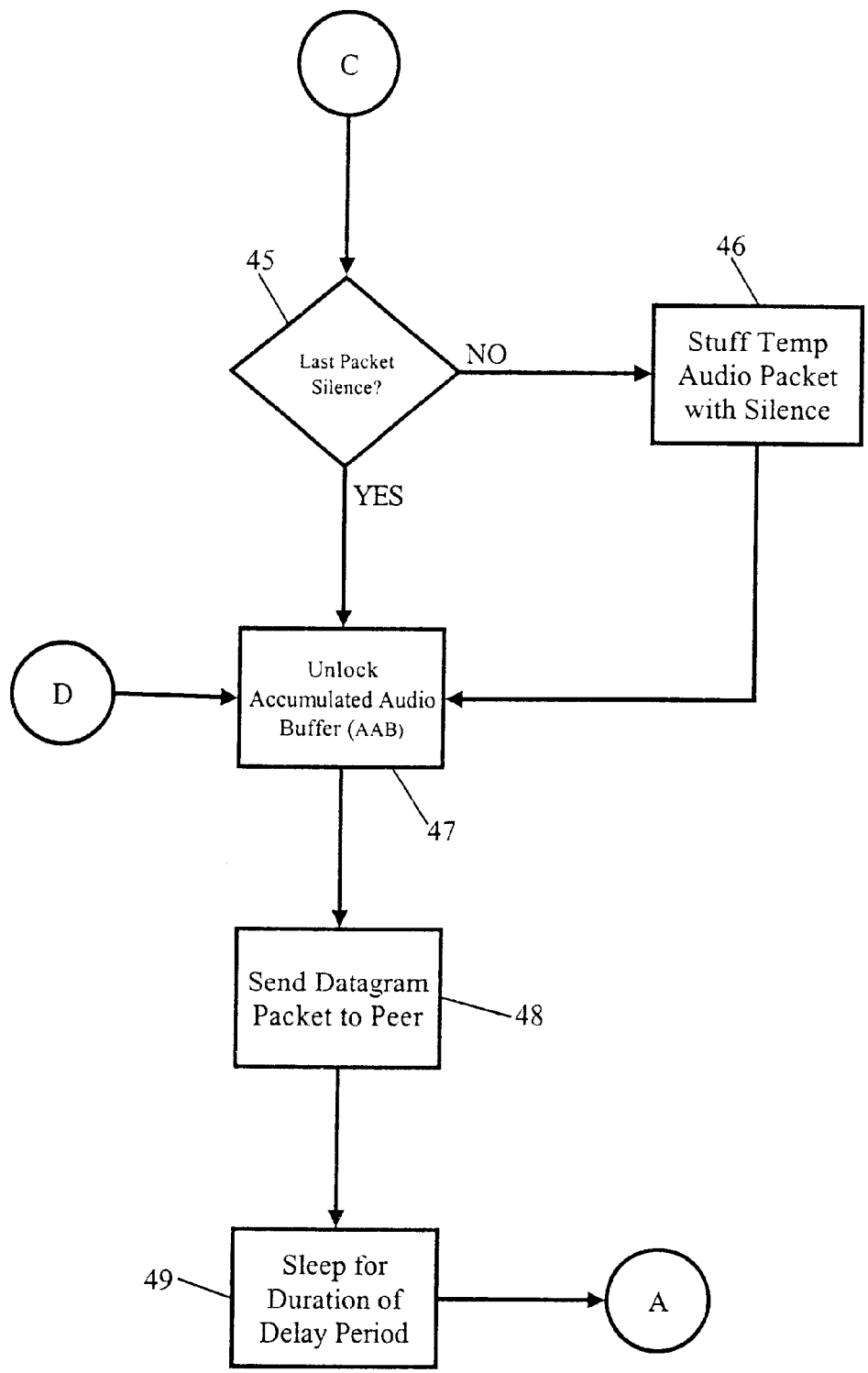

FIGS. 3A–3C, taken together, are a flow chart illustrating a method for real time transmission performed by the real time audio producer 20 in accordance with the inventive arrangements. The method can begin in step 31 in which an RTP-compliant audio packet is initialized. In particular, static RTP header information can be stored in the first byte of the audio packet, a marker bit and payload type can be stored in the second byte, and the sequence number can be stored in the third and fourth bytes. Finally, an encoding format can be chosen, for example A-law encoding or $\mu$-law encoding.

In step 32, a maximum packetization delay can be chosen. The maximum packetization delay is an RTP parameter for determining the maximum time interval during which audio data must be transmitted to an audio output device in order to maintain a real time audio stream to the audio output device. Typically, the packetization delay is specified in terms of milliseconds. In one representative embodiment of the present invention, the maximum packetization delay is set to 40 milliseconds.

Notably, although not limited to any particular implementation, the real time audio producer 20 of FIG. 2 can be implemented in an object-oriented architecture using well-known object-oriented programming tools, for example the Java programming language. Also, as noted above, many of the core functions of the real time audio can be performed in a thread in a multi-threaded application. As such, in a representative embodiment of the present invention in which an object-oriented approach is taken, the real time audio producer can be implemented in a class which extends the Java Thread class and implements a Buffer-TransferHandler class of the Java Media Framework (JMF™) as described in the Java Media Framework API Guide (JMF API Guide) published by Sun Microsystems, Inc. of Mountain View, Calif. on Nov. 19, 1999 (incorporated herein by reference) and the Java Media Framework Specification (JMF Specification) also published by Sun Microsystems, Inc. on Nov. 23, 1999 (incorporated herein by reference). In particular, the Thread class can provide pre-built functionality for implementing time-critical threads. Accordingly, in accordance with generally accepted object oriented programming techniques, the initialization step 31 and the setting of the maximum packetization delay in step 32 both can occur in a constructor to the real time audio transmitter class.

The real time audio producer class also can include an addPeer method member for adding a peer for receiving transmissions of audio and silence data. In the addPeer method, the ninth through twelfth bytes of the audio packet can be configured with data for identifying the synchronization source in accordance with the RTP data transfer protocol. Also, a Java DatagramPacket object can be instantiated which can include the audio packet, an indication of the size in bytes of the audio packet, the IP address of the peer to be added, and the port on which the peer is to communicate with an instance of the real time audio producer class. Thus, in steps 33 and 34, to synchronously transmit audio and silence packets to a telephony peer, the peer adding method need be called with the IP address and port of the telephony peer specified therein.

In step 34, the real time audio transmitter need be linked to a TTS engine which can asynchronously provide speech audio for transmission to the telephony peer in accordance with the inventive arrangements. Although many communication links can suffice, including routine TCP/IP communications, in the representative embodiment, the TTS engine can transfer speech audio to the real time audio producer through a buffer using the BufferTransferHandler method of JMF. Subsequently, the TTS engine can transfer audio data to the real time audio producer through a transferData method.

More specifically, the transferData method can read audio data through an instance of a JMF PushBufferStream and can compress the audio data into an accumulated audio buffer (AAB) using a chosen compression algorithm, for example, 16-bit linear. The AAB is a queue in which varying sized chunks of audio data received from TTS engine can be stored and queued for transmission to the audio output device. As such, a queue pointer can be initialized and maintained such that the queue pointer points to the head of the next chunk of audio data to be transmitted to the audio output device. Notably, in the case where an object oriented architecture is employed, the transferData method can be a member of the real time audio producer class in which the PushBufferStream instance can be passed therein as a parameter to the method.

In a representative embodiment in which the real time audio producer is a thread in a multi-threaded application, in step 36, a thread can be opened for processing asynchronously received speech audio from the linked TTS engine. Subsequently, in step 37, the thread can run. In the representative embodiment of the present invention, once it can be anticipated that the TTS engine will asynchronously provide speech audio, the thread can be programmed to wake at the beginning of a time interval determined by the maximum packetization delay. Upon awakening, the thread can perform the following steps subsequent to which the thread can "sleep" for the duration of the time interval.

First, in accordance with RTP, in step 38, upon awakening, the sequence number of the fourth byte in the audio packet is updated. Additionally, bytes five through eight of the audio packet can be updated with the current time in milliseconds. In step 39, to avoid logic race conditions with the transferData method, the AAB is locked in accordance with proper multi-threaded programming techniques well known in the art. In step 40, the AAB can be examined to determine if the AAB contains speech audio asynchronously received from the TTS engine through the transferData method. If no speech audio bytes are detected in the AAB, the method can continue in FIG. 3C through the jump circle C. Otherwise, if speech audio bytes are detected in the AAB, the method can continue in FIG. 3B through the jump circle B.

In step 41 of FIG. 3B, it can further be determined if enough speech audio has been asynchronously received from the TTS engine to provide for a complete RTP-compliant packet according to a default audio data size. In a representative embodiment of the present invention, the default audio data size can be 320 bytes or eight times the default packet delay of 40 milliseconds, although the invention is not limited in this regard. Beginning with the first byte of data indicated by the queue pointer, if the AAB is determined to contain enough speech data to completely fill the audio packet, in step 41 the AAB can be copied into the audio packet for transmission to the telephony peer through the datagram socket created by the addPeer method described above. Moreover, the queue pointer can be updated to point to the first byte not copied into the audio packet.

Otherwise, if the AAB is determined not to contain enough speech audio to fill a complete the audio packet, in step 43 the AAB can be copied into the audio packet for transmission to the telephony peer through the datagram socket created by the addpeer method described above. Additionally, in step 44, silence data denoted by 0x7f can be inserted in the audio packet until enough data, both audio and silence, is contained in the audio packet such that the audio packet is completely filled with both audio and silence data. In either case, the audio packet having been completely filled with audio data and, potentially silence data, the method can continue through jump circle D leading to FIG. 3C.

FIG. 3C depicts that portion of the method of the invention in which no speech audio bytes are detected in the AAB in step 40. In step 45, if the last audio packet transmitted to the audio output device contained only silence data and no audio data, the audio packet can be reused and no further action prior to transmission is required. However, if the last audio packet contained audio data, then in step 46 an audio packet containing silence data and not audio data must be constructed by repetitively transmitting the 2-byte sequence 0x7fff.

In step 47, the audio packet having been constructed in accordance with the inventive arrangements, the AAB can be unlocked so that the TTS engine can resume asynchronously providing speech audio through the transferData method. Subsequently, in step 48, the datagram containing the audio packet can be transmitted across the datagram socket using the send( ) method of the Java DatagramSocket class. Once the data gram has been sent to the audio output device via the telephony gateway, in step 49 the real time audio producer can determine how many milliseconds remain in the time interval and can sleep for the duration of the time interval prior to waking and performing the process again.

What is claimed is:

1. A system for real time transmission of speech audio asynchronously received from a text-to-speech engine (TTS) in a computer communications network comprising:
   a TTS engine for producing speech asynchronous audio for transmission in the computer communications network; and,
   a real time speech audio producer for receiving said asynchronous speech audio and for producing formatted audio packets for transmission over the network according to a transmission interval defined by a packetization delay.

2. The system of claim 1, further comprising:
   a telephony gateway server communicatively linked to said real time speech audio producer, said telephony gateway server receiving said produced formatted audio packets transmitted according to said transmission interval.

3. The system of claim 1, wherein said real time speech audio producer comprises:
   a TTS audio receiver for receiving said produced speech audio from said TTS engine;
   an audio data compressor for compressing said received speech audio into an audio buffer;
   a speech audio packet formatter for formatting speech audio in said audio buffer into formatted audio packets suitable for transmission over the network; and,
   a transmission queue for queuing said formatted audio packets for transmission over the network.

4. The system of claim 3, wherein said real time speech audio producer further comprises:
   a silence detector for detecting transmission intervals in which no speech audio data from said TTS engine is available for transmission across the network; and,
   a silence packet generator for producing formatted silence packets in lieu of said formatted audio packets responsive to detecting said intervals in which no speech audio data from said TTS engine is available for transmission across the network.

5. The system of claim 1, wherein said real time speech audio producer comprises:
   a silence detector for detecting transmission intervals in which no speech audio from said TTS engine is available for transmission across the network; and,
   a silence packet generator for producing formatted silence packets in lieu of said formatted audio packets responsive to detecting said intervals in which no speech audio data from said TTS engine is available for transmission across the network.

6. The system of claim 1, wherein said transmission interval is determined according to a packetization delay parameter.

7. The system of claim 1, wherein said real time speech audio producer implements a thread for execution in a multi-threaded application.

8. A method for real time transmission of speech audio data received from a text-to-speech (TTS) engine in a computer communications network comprising:
   receiving asynchronous speech audio data from the TTS engine;
   formatting said received asynchronous speech audio data into formatted audio packets suitable for transmission to an audio output device over the computer communications network; and,
   transmitting said formatted audio packets to said audio output device over the computer communications network according to a transmission interval defined by a packetization delay.

9. The method of claim 8, further comprising:
   detecting transmission intervals in which no speech audio data from the TTS engine is available for transmission across the network; and,
   formatting silence packets and transmitting said silence packets in lieu of said audio packets responsive to detecting said transmission intervals in which no speech audio data from the TTS engine is available for transmission across the network.

10. The method of claim 9, further comprising:
    queuing said formatted audio packets and said formatted silence packets for transmission to said audio output device over the computer communications network according to said transmission interval.

11. The method of claim 9, further comprising:
    implementing said queuing step in a thread for execution in a multi-threaded application.

12. The method of claim 8, further comprising:
    compressing said speech audio into an audio buffer from which said audio packets can be formatted in said formatting step.

13. The method of claim 8, further comprising:
    queuing said formatted audio packets for transmission to said audio output device over the computer communications network according to said transmission interval.

14. The method of claim 8, wherein said step of synchronously transmitting said formatted audio packets to said audio output device over the computer communications network according to a transmission interval comprises:
    synchronously transmitting said formatted audio packets to a telephony gateway server over the computer communications network according to a transmission interval.

15. The method of claim 8, further comprising:
    determining said transmission interval according to a packetization delay parameter.

16. The method of claim 8, further comprising:
    implementing said formatting and transmitting steps in a thread for execution in a multi-threaded application.

17. The method of claim 16, further comprising:
    implementing said compressing step in said thread.

18. The method of claim 16, further comprising:
    implementing said queuing step in a thread for execution in a multi-threaded application.

19. A machine readable storage, having stored thereon a computer program for real time transmission of speech audio received from a text-to-speech (TTS) engine in a computer communications network, said computer program having a plurality of code sections executable by a machine for causing the machine to perform the steps of:

receiving asynchronous speech audio from the TTS engine;

formatting said received asynchronous speech audio into formatted audio packets suitable for transmission to an audio output device over the computer communications network; and, transmitting said formatted audio packets to said audio output device over the computer communications network according to a transmission interval defined by a packetization delay.

20. The machine readable storage of claim 19, further comprising:

detecting transmission intervals in which no speech audio data from the TTS engine is available for transmission across the network; and, formatting silence packets and transmitting said silence packets in lieu of said audio packets responsive to detecting said transmission intervals in which no speech audio data from the TTS engine is available for transmission across the network.

21. The machine readable storage of claim 20, further comprising:

queuing said formatted audio packets and said formatted silence packets for transmission to said audio output device over the computer communications network according to said transmission interval.

22. The machine readable storage of claim 20, further comprising:

implementing said formatting audio packets step, said transmitting said audio packets step, said detecting step, and said formatting and transmitting said silence packets step in a thread for execution in a multi-threaded application.

23. The machine readable storage of claim 19, further comprising:

compressing said speech audio into an audio buffer from which said audio packets can be formatted in said formatting step.

24. The machine readable storage of claim 19, further comprising:

queuing said formatted audio packets for transmission to said audio output device over the computer communications network according to said transmission interval.

25. The machine readable storage of claim 19, wherein said step of synchronously transmitting said formatted audio packets to said audio output device over the computer communications network according to a transmission interval comprises:

synchronously transmitting said formatted audio packets to a telephony gateway server over the computer communications network according to a transmission interval.

26. The machine readable storage of claim 19, further comprising:

determining said transmission interval according to a packetization delay parameter.

27. The machine readable storage of claim 19, further comprising:

implementing said formatting and transmitting steps in a thread for execution in a multi-threaded application.

28. The machine readable storage of claim 27, further comprising:

implementing said compressing step in said thread.

29. The machine readable storage of claim 27, further comprising:

implementing said queuing step in said thread.

* * * * *